T. H. DODGE.
Domestic Boiler.
No. 9,744.
Patented May 24, 1853.
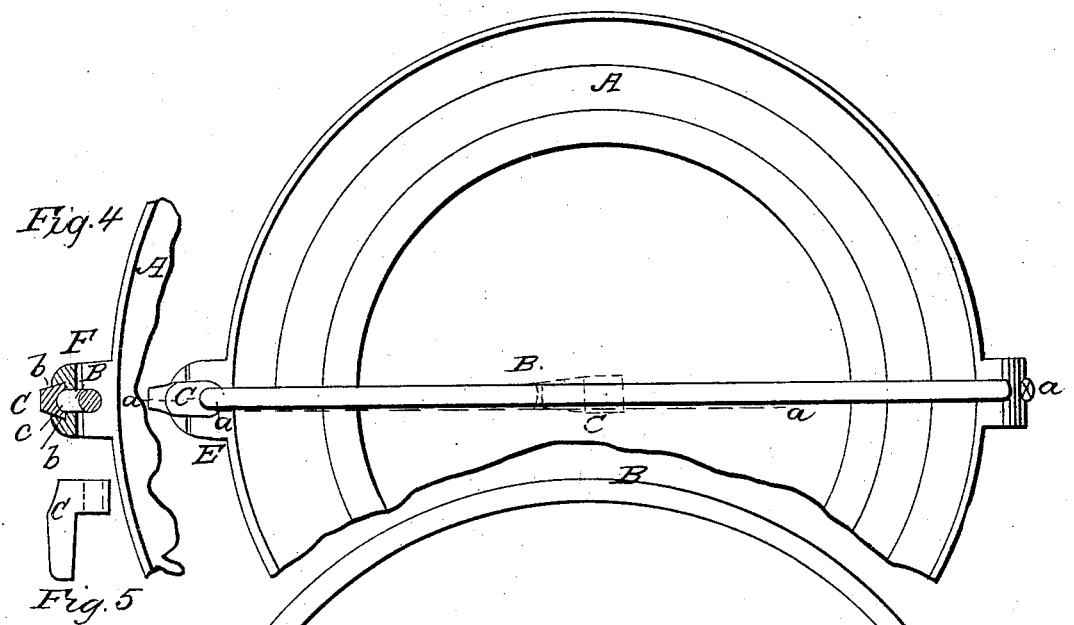
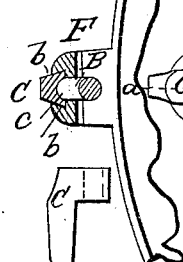
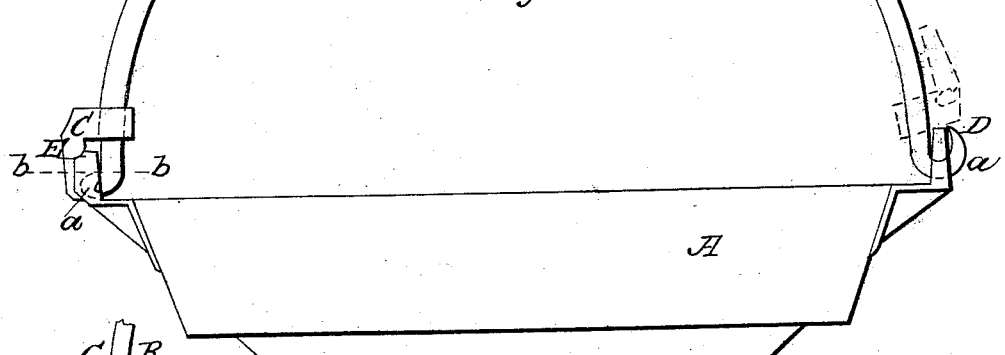
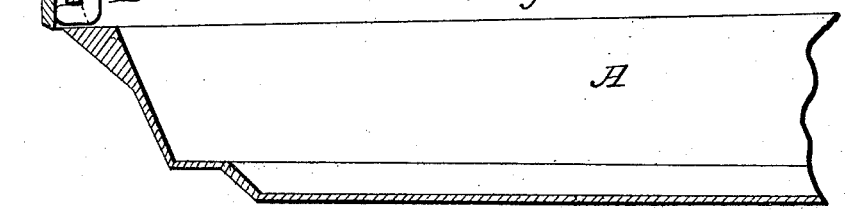

UNITED STATES PATENT OFFICE.

THOS. H. DODGE, OF NASHUA, NEW HAMPSHIRE.

KETTLE-BAIL.

Specification of Letters Patent No. 9,744, dated May 24, 1853.

*To all whom it may concern:*

Be it known that I, THOMAS H. DODGE, of Nashua, in the county of Hillsboro and State of New Hampshire, have invented a new and useful contrivance for keeping the bails of kettles and other culinary vessels stationary or in a vertical or other position when desired; and I do hereby declare that the following is a full and clear description of the same, reference being had to the accompanying drawings, forming part of this specification, in which—

Figure 1, is a plan of a frying pan or kettle having my improved bail fastener attached and the bail secured in a vertical position. Fig. 2 is a side elevation of the same. Fig. 3, is a vertical section of the kettle and fastener, through the line *a, a,* in Fig. 1. Fig. 4, is a horizontal section of the same through the line *b, b,* in Fig. 2. Fig. 5, is a detached view of the sliding dovetail or other shaped bail festener.

Similar letters of reference in each of the several figures indicate corresponding parts.

The nature of my invention consists in placing on the bail of the kettle or other vessel a sliding dovetail shaped eye piece—which is made to slide on and around the bail of the kettle, and when it is desired to have the bail in an upright and permanent position to slide down to one of the sides of the kettle and its dovetail or other shaped end to fit snugly in a female dovetail or other shaped groove cut in one of the ears or flanches of the kettle in the manner hereinafter described. The said flanches having the dovetail cast either on their outside or inside, as desired.

To enable others skilled in the art to make and use my invention I will proceed to describe its construction and application.

A represents a frying pan—and B, the bail of the same, raised to a vertical position and secured in that position by the dovetail or other shaped sliding piece C, which is secured on the bail of the kettle in the manner shown in Figs. 1, 2, and 3. This fastener is secured on the bail before the ends *a, a,* are bent, and secured in the eye of the ears D, E. This piece C, has a groove *c*, in it for the end of the bail to work in. The ears D, E, are cast on the kettle A, and one of them, that lettered E, has a female dovetail or other shaped groove *b*, cast in it, either on the outside or inside (as shown in Fig. 4) in which groove the dovetail end of the sliding piece C, fits, and thereby secures the bail of the kettle permanently, for the time being—in a vertical or upright position.

By examining Figs. 1, and 2, the operation of this contrivance will be seen. Its position when the bail is fastened, being indicated by the black lines—and when loose by dotted lines in two different positions— either of which position it can occupy without being in the way.

The fastener or sliding piece C, might have a set screw attached to it for screwing it fast to the bail when it is desired to have the bail loose—but this is not essential.

The benefits derived from this contrivance are—1st. That of preventing the kettle swinging back and forth when carried by the handle—2nd. Doing away with the inconvenience and difficulty experienced in pouring hot water from the kettle when the common swinging handle is used—3rd. Obviating the difficulty and inconvenience experienced in using kettles having fixed handles, which are always in the way when not in use. All these difficulties are obviated by my invention as before stated, for it keeps the handle or bail permanently in the position desired, for any length of time, and then admits of the same being let loose and to fall down by the side of the kettle, out of the way.

What I claim as my invention and desire to secure by Letters Patent, is—

The sliding dovetail or other shaped piece C; which slides on the bail B, in combination with the female dovetail or other shaped groove *b*, cast in the flanch or ear E; either on the inside or outside for keeping the bail B, permanently fixed in any position desired and for any length of time,— and at the same time admitting of its being left loose and operating if desired, like the ordinary swinging bail.

THOMAS H. DODGE.

Witnesses:
AARON F. STEVERS,
M. F. DODGE, Jr.